United States Patent
Nicodemus et al.

(10) Patent No.: US 12,337,829 B2
(45) Date of Patent: Jun. 24, 2025

(54) METHOD FOR THE AT LEAST PARTIALLY AUTOMATED GUIDANCE OF A MOTOR VEHICLE

(71) Applicant: Robert Bosch GmbH, Stuttgart (DE)

(72) Inventors: Rolf Nicodemus, Bietigheim-Bissingen (DE); Stefan Nordbruch, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 257 days.

(21) Appl. No.: 18/002,846

(22) PCT Filed: Sep. 17, 2021

(86) PCT No.: PCT/EP2021/075669
§ 371 (c)(1),
(2) Date: Dec. 21, 2022

(87) PCT Pub. No.: WO2022/063700
PCT Pub. Date: Mar. 31, 2022

(65) Prior Publication Data
US 2023/0130675 A1   Apr. 27, 2023

(30) Foreign Application Priority Data

Sep. 24, 2020   (DE) ...................... 10 2020 212 014.5

(51) Int. Cl.
*B60W 30/06*   (2006.01)
*G05D 1/00*   (2006.01)
(Continued)

(52) U.S. Cl.
CPC .......... *B60W 30/06* (2013.01); *G05D 1/0276* (2013.01); *G06Q 30/04* (2013.01); *H04L 63/0823* (2013.01); *G06Q 2240/00* (2013.01)

(58) Field of Classification Search
CPC .............. B60W 30/06; B60W 2556/45; G05D 1/0276; G05D 1/0055; G06Q 30/04;
(Continued)

(56) References Cited

U.S. PATENT DOCUMENTS

2018/0082504 A1   3/2018   Park
2019/0089695 A1*   3/2019   Sapena Soler ........ H04L 63/123
(Continued)

FOREIGN PATENT DOCUMENTS

DE   102012025317 A1   6/2014
DE   102017217720 A1   4/2019
(Continued)

OTHER PUBLICATIONS

International Search Report for PCT/EP2021/075669, Issued Jan. 26, 2022.

*Primary Examiner* — Justin Holmes
(74) *Attorney, Agent, or Firm* — NORTON ROSE FULBRIGHT US LLP

(57) ABSTRACT

A method for the at least partially automated guidance of a motor vehicle within an infrastructure. The method comprises receipt of an instruction for the at least partially automated guidance of the motor vehicle within the infrastructure. In the event of a positive check of the instruction, the motor vehicle is guided in an at least partially automated manner within the infrastructure. A corresponding system, a computer program, and a machine-readable storage medium, are also described.

10 Claims, 2 Drawing Sheets

(51) Int. Cl.
*G06Q 30/04* (2012.01)
*H04L 9/40* (2022.01)

(58) Field of Classification Search
CPC .... G06Q 2240/00; G06Q 50/40; G06Q 10/06; H04L 63/0823; G08G 1/0112; G08G 1/017; G08G 1/146; G08G 1/149; B62D 15/0285; G07B 15/063
See application file for complete search history.

(56) References Cited

U.S. PATENT DOCUMENTS

2019/0306147 A1\* 10/2019 Uhr ........................ H04L 9/3263
2021/0110714 A1\* 4/2021 Maruiwa ................ G08G 1/149

FOREIGN PATENT DOCUMENTS

| | | |
|---|---|---|
| EP | 3261074 A1 | 12/2017 |
| EP | 3812244 A1 | 4/2021 |
| JP | 2018041381 A | 3/2018 |
| JP | 6886262 B2 | 6/2021 |
| KR | 20170000867 A | 1/2017 |

\* cited by examiner

METHOD FOR THE AT LEAST PARTIALLY AUTOMATED GUIDANCE OF A MOTOR VEHICLE

FIELD

The present invention relates to a method for the at least partially automated guidance of a motor vehicle within an infrastructure.

The present invention also relates to a system for the at least partially automated guidance of a motor vehicle within an infrastructure, to a computer program, and to a machine-readable storage medium.

BACKGROUND INFORMATION

European Patent Application No. EP 3 261 074 A1 describes a method for parking autonomous vehicles.

SUMMARY

An object on which the present invention relates to providing an efficient concept for the efficient at least partially automated guidance of a motor vehicle within an infrastructure.

This object may be achieved by the present invention. Advantageous configurations of the present invention are disclosed herein.

According to a first aspect of the present invention, a method for the at least partially automated guidance of a motor vehicle within an infrastructure is provided. According to an example embodiment of the present invention, the method comprises the following steps:

receipt of first instruction signals by a first server of a first operator of the infrastructure, the instruction signals representing an instruction of an instruction giver for the at least partially automated guidance of the motor vehicle within the infrastructure, a first check by the first server of whether the instruction is able to be executed, transmission of second instruction signals by the first server to a second server of a platform for the at least partially automated guidance of a motor vehicle within the infrastructure of a second operator in the event of a positive first check, the second instruction signals representing the instruction for the at least partially automated guidance of the motor vehicle within the infrastructure, a second check by the second server of whether the instruction is able to be executed, generation of control signals for the at least partially automated control of a lateral and/or longitudinal guidance of the motor vehicle on the basis of the instruction by the platform, in particular by the second server, in the event of a positive second check, in such a way that the instruction is executed in an at least partially automated control of the lateral and/or longitudinal guidance of the motor vehicle, and output of the generated control signals.

According to a second aspect of the present invention, a system for the at least partially automated guidance of a motor vehicle within an infrastructure is provided, the system being designed to execute all the steps of the method according to the first aspect, the system comprising the first server and the platform.

According to a third aspect of the present invention, a computer program is provided comprising commands which, when the computer program is executed by a computer, for example by the system according to the second aspect, cause the computer to execute a method according to the first aspect.

According to a fourth aspect of the present invention, a machine-readable storage medium is provided on which the computer program according to the third aspect is stored.

The present invention is based on and incorporates the finding that the above object can be achieved by the fact that it is checked twice whether the instruction of the instruction giver for the at least partially automated guidance of the motor vehicle within the infrastructure is able to be executed before it is then in fact executed in the event of two positive checks.

Firstly, the first server of the first operator of the infrastructure checks whether the instruction is able to be executed.

In the case of a positive check, this instruction is then transferred by the first server to the second server of the platform for the at least partially automated guidance of a motor vehicle within the infrastructure of the second operator.

The second server subsequently checks whether the instruction is able to be executed.

In the event of a positive second check, appropriate control signals for the at least partially automated control of a lateral and/or longitudinal guidance of the motor vehicle on the basis of the instruction are then generated, so that the instruction is executed in an at least partially automated control of the lateral and/or longitudinal guidance of the motor vehicle.

The generated control signals are then output.

This may bring about, for example, a technical advantage that the instruction is able to be processed efficiently. Furthermore it may bring about, for example, the technical advantage that the instruction is able to be executed efficiently.

This may also bring about in particular the technical advantage that the first operator of the infrastructure does not himself have to provide and/or maintain a platform for the at least partially automated guidance of a motor vehicle within the infrastructure.

The technical implementation of how the motor vehicle is guided in an at least partially automated manner within the infrastructure using the platform is therefore the responsibility of the second operator, i.e., the operator of the platform.

Technical effort is thus advantageously reduced for the first operator.

Furthermore, this may bring about in particular the technical advantage that the second operator is able to make the service of the at least partially automated guidance of a motor vehicle within the infrastructure available to the first operator efficiently. Thus, for example, the second operator is able to concentrate only on the at least partially automated guidance of motor vehicles within the infrastructure and does not also have to undertake additional technical tasks with regard to operating the infrastructure, for example maintenance of the infrastructure.

This may bring about in particular the technical advantage that a concept is provided for the efficient at least partially automated guidance of a motor vehicle within an infrastructure.

The formulation "at least partially automated guidance" covers one or more of the following cases: assisted guidance, partially automated guidance, highly automated guidance, or fully automated guidance.

Assisted guidance means that a driver of the motor vehicle constantly performs either the lateral or the longitudinal guidance of the motor vehicle. The other driving task in each case (i.e., control of the longitudinal or lateral guidance of the motor vehicle) is carried out automatically. This means, therefore, that during assisted guidance of the motor vehicle either the lateral or the longitudinal guidance is controlled automatically.

Partially automated guidance means that, in a specific situation (e.g.: driving on a freeway, driving within a parking facility, overtaking an object, driving within a traffic lane which is defined by lane markings), and/or for a certain period of time, a longitudinal and a lateral guidance of the motor vehicle are controlled automatically. A driver of the motor vehicle does not himself have to control the longitudinal and lateral guidance of the motor vehicle manually. However, the driver must constantly monitor the automatic control of the longitudinal and lateral guidance in order to be able to intervene manually if necessary. The driver must be ready at all times to take over vehicle guidance completely.

Highly automated guidance means that, for a certain period of time in a specific situation (e.g.: driving on a freeway, driving within a parking facility, overtaking an object, driving within a traffic lane which is defined by lane markings), a longitudinal and a lateral guidance of the motor vehicle are controlled automatically. A driver of the motor vehicle does not himself have to control the longitudinal and lateral guidance of the motor vehicle manually. The driver does not have to constantly monitor the automatic control of the longitudinal and lateral guidance in order to be able to intervene manually if necessary. If necessary, a takeover request is automatically issued to the driver, in particular with an adequate time reserve, to take over the control of the longitudinal and lateral guidance. The driver must therefore be potentially capable of taking over control of the longitudinal and lateral guidance. Limits of the automatic control of the lateral and longitudinal guidance are recognized automatically. In the case of highly automated guidance, it is not possible to bring about a minimal-risk state automatically in every starting situation.

Fully automated guidance means that, in a specific situation (e.g.: driving on a freeway, driving within a parking facility, overtaking an object, driving within a traffic lane which is defined by lane markings), a longitudinal guidance and a lateral guidance of the motor vehicle are controlled automatically. A driver of the motor vehicle does not himself have to control the longitudinal and lateral guidance of the motor vehicle manually. The driver does not have to monitor the automatic control of the longitudinal and lateral guidance in order to be able to intervene manually if necessary. Before the automatic control of the lateral and longitudinal guidance is ended, a request is automatically made to the driver, in particular with an adequate time reserve, to take over the driving task (controlling the lateral and longitudinal guidance of the motor vehicle). Should the driver fail to take over the driving task, reversion to a minimal-risk state occurs automatically. Limits of the automatic control of the lateral and longitudinal guidance are recognized automatically. In all situations, it is possible to revert automatically to a minimal-risk system state.

According to one specific embodiment of the present invention, it is provided that first certificate signals, which represent a first digital certificate, are received by the first server, the first check being carried out on the basis of the first digital certificate, the first digital certificate comprising a first data set which comprises one or more of the following data items: specification data of the motor vehicle, which represent a technical specification regarding an at least partially automated guidance of the motor vehicle; identification data, which represent an identification of the motor vehicle, and/or of a driver of the motor vehicle, and/or of the instruction giver; payment data, e.g., credit card data or account number data.

This may bring about, for example, the technical advantage that the first check is able to be carried out efficiently.

Technical specifications regarding an at least partially automated guidance of the motor vehicle comprise, e.g., one or more of the following specifications: number of environment sensors comprised by the motor vehicle; type of environment sensors comprised by the motor vehicle; maximum speed of the motor vehicle; maximum acceleration of the motor vehicle; turning circle of the motor vehicle; wheelbase of the motor vehicle; length of the motor vehicle; width of the motor vehicle; height of the motor vehicle; ground clearance of the motor vehicle; weight of the motor vehicle; range of an environment sensor of the motor vehicle.

The first digital certificate is issued, e.g., by an official certificate authority.

According to a further specific embodiment of the present invention, it is provided that, in the event of a positive check, the first digital certificate is transmitted by the first server to the second server, so that the second server receives the first digital certificate, the second check being carried out on the basis of the first digital certificate.

This may bring about, for example, the technical advantage that the second check is able to be carried out efficiently.

According to one specific embodiment of the present invention, it is provided that second certificate signals, which represent a second digital certificate, are received by the second server, the second check being carried out on the basis of the second digital certificate, the second digital certificate comprising a second data set which comprises one or more of the following data items: specification data of the motor vehicle, which represent a technical specification regarding an at least partially automated guidance of the motor vehicle; identification data, which represent an identification of the motor vehicle, and/or of a driver of the motor vehicle, and/or of the instruction giver. This may bring about, for example, the technical advantage that the second check is able to be carried out efficiently.

Statements made in connection with the first digital certificate apply mutatis mutandis to the second digital certificate, and vice versa.

This may bring about in particular the technical advantage that, by using the first and/or second digital certificate, it can be checked by the first and/or second server respectively whether the motor vehicle which is to be guided in an at least partially automated manner within the infrastructure is in fact technically capable of being guided in an at least partially automated manner within the infrastructure.

Furthermore, this may bring about in particular the technical advantage that it can be efficiently ensured that, for example, only an instruction from an authorized instruction giver is executed.

Furthermore, this may bring about in particular the technical advantage that the motor vehicle which, according to the instruction, is to be guided in an at least partially automated manner within the infrastructure is indeed guided in an at least partially automated manner within the infrastructure.

For example, it is provided that the second server receives the second digital certificate from the motor vehicle.

For example, it is provided that the first server obtains the first digital certificate from the instruction giver.

In particular, the second server is then capable of checking whether the first digital certificate, which the first server has transferred to the second server, matches the second digital certificate, which the second server has obtained from the motor vehicle.

Only if, for example, the two certificates are identical, and/or match one another, is it provided that the instruction is executed by the platform.

According to one specific embodiment of the present invention, it is provided that the first check comprises a check of whether the instruction giver has made payments required for the at least partially automated guidance of the motor vehicle, and/or it is ensured that payments required for the at least partially automated guidance of the motor vehicle are being made, e.g., by direct debit or by consent(s).

This may bring about, for example, the technical advantage that it can be efficiently ensured that the instruction is executed only when the required payments have been made.

According to one specific embodiment of the present invention, it is provided that the second check comprises a check of whether the first operator has made payments required for the at least partially automated guidance of the motor vehicle, and/or it is ensured that payments required for the at least partially automated guidance of the motor vehicle are being made, e.g., by direct debit or by consent(s).

This may bring about, for example, the technical advantage that it can be efficiently ensured that the first operator has made the required payments.

In one specific embodiment of the present invention, it is provided that the second check comprises a check of whether the instruction transmitted by the first server is signed by a digital signature of the first operator.

This may bring about, for example, the technical advantage that it can be efficiently ensured that the transmitted instruction that is received by the second server was indeed transmitted by the first server.

In one specific embodiment of the present invention, it is provided that the first check comprises a check of whether the instruction of the instruction giver is signed by a digital signature of the instruction giver.

This may bring about, for example, the technical advantage that it can be efficiently ensured that the instruction of the instruction giver that is received by the first server does indeed originate from the instruction giver.

In one specific embodiment of the present invention, it is provided that the infrastructure comprises an element selected from the following group of infrastructure elements: parking facility, in particular parking garage, tunnel, bridge, construction site, junction, in particular four-way or three-way junction, entrance ramp of a freeway, toll station.

This may bring about, for example, the technical advantage that particularly suitable infrastructures are used.

Technical functionalities of the method according to the first aspect may be taken mutatis mutandis from corresponding technical functionalities of the system according to the second aspect, and vice versa.

This means in particular, therefore, that method features may be taken from system features, and vice versa.

In one specific embodiment of the present invention, it is provided that the method according to the first aspect is executed or carried out by the system according to the second aspect.

According to one specific embodiment of the present invention, the method according to the first aspect is a computer-implemented method.

According to one specific embodiment of the present invention, it is provided that the method according to the first aspect comprises an at least partially automated control of the lateral and/or longitudinal guidance of the motor vehicle on the basis of the issued control signals.

According to one specific embodiment of the present invention, it is provided that the control signals comprise remote control signals for the remote control of the lateral and/or longitudinal guidance of the motor vehicle.

According to one specific embodiment of the present invention, the platform comprises one or more environment sensors, which are arranged in a spatially distributed manner within the infrastructure.

An environment sensor is, for example, one of the following environment sensors: radar sensor, LIDAR sensor, ultrasonic sensor, infrared sensor, video sensor, and magnetic field sensor.

In one specific embodiment of the present invention, the platform comprises one or more communication devices, which are arranged in a spatially distributed manner within the infrastructure.

By way of the communication devices, for example the control signals may be transmitted to the motor vehicle.

In one specific embodiment of the present invention, the instruction giver is the motor vehicle, or the driver of the motor vehicle, or a booking system.

In one specific embodiment of the present invention, the first operator and the second operator are identical. In one specific embodiment of the present invention, the first operator and the second operator are different.

Exemplary embodiments of the present invention are illustrated in the figures and will be explained in greater detail in the following description.

DETAILED DESCRIPTION OF EXAMPLE EMBODIMENTS

Figure 1:
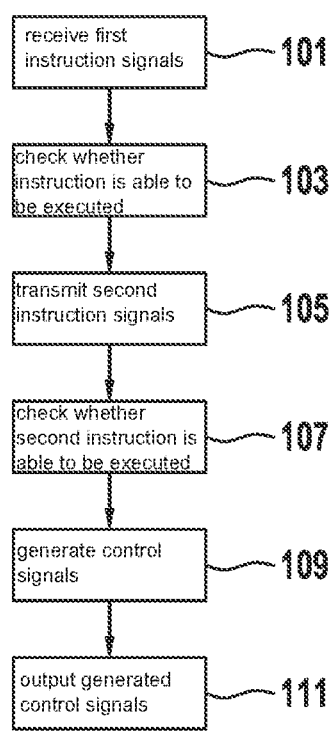
FIG. 1 shows a flow diagram of a method for the at least partially automated guidance of a motor vehicle within an infrastructure, according to an example embodiment of the present invention.

FIG. 1 is a flow diagram of a method for the at least partially automated guidance of a motor vehicle within an infrastructure, comprising the following steps:

receipt 101 of first instruction signals by a first server of a first operator of the infrastructure, the instruction signals representing an instruction of an instruction giver for the at least partially automated guidance of the motor vehicle within the infrastructure, a first check 103 by the first server of whether the instruction is able to be executed, transmission 105 of second instruction signals by the first server to a second server of a platform for the at least partially automated guidance of a motor vehicle within the infrastructure of a second operator in the event of a positive first check, the second instruction signals representing the instruction for the at least partially automated guidance of the motor vehicle within the infrastructure, a second check 107 by the second server of whether the instruction is able to be executed, generation 109 of control signals for the at least partially automated control of a lateral and/or longitudinal guidance of the motor vehicle on the basis of the instruction by the platform in the event of a positive second check in such a way that the instruction is executed in an at least partially automated control of the lateral and/or longitudinal guidance of the motor vehicle, and output 111 of the generated control signals.

Figure 2:
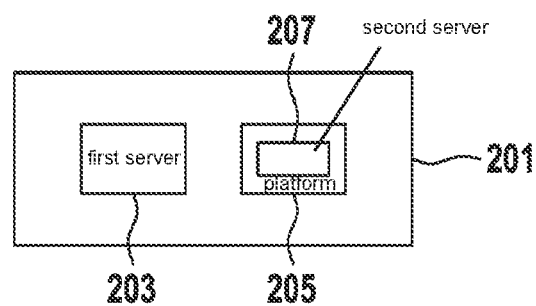
FIG. 2 shows a system for the at least partially automated guidance of a motor vehicle within an infrastructure, according to an example embodiment of the present invention.

FIG. 2 shows a system 201 for the at least partially automated guidance of a motor vehicle within an infrastructure.

System 201 is designed to execute all the steps of the method according to the first aspect.

System 201 comprises first server 203 and comprises platform 205 including second server 207.

Figure 3:
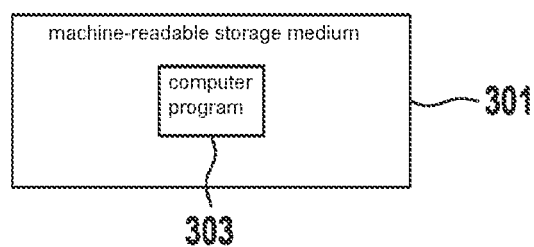
FIG. 3 shows a machine-readable storage medium, according to an example embodiment of the present invention.

FIG. 3 shows a machine-readable storage medium 301.

A computer program 303 is stored on machine-readable storage medium 301.

Computer program 303 comprises commands which, when computer program 303 is executed by a computer, cause the computer to execute a method according to the first aspect.

Figure 4:
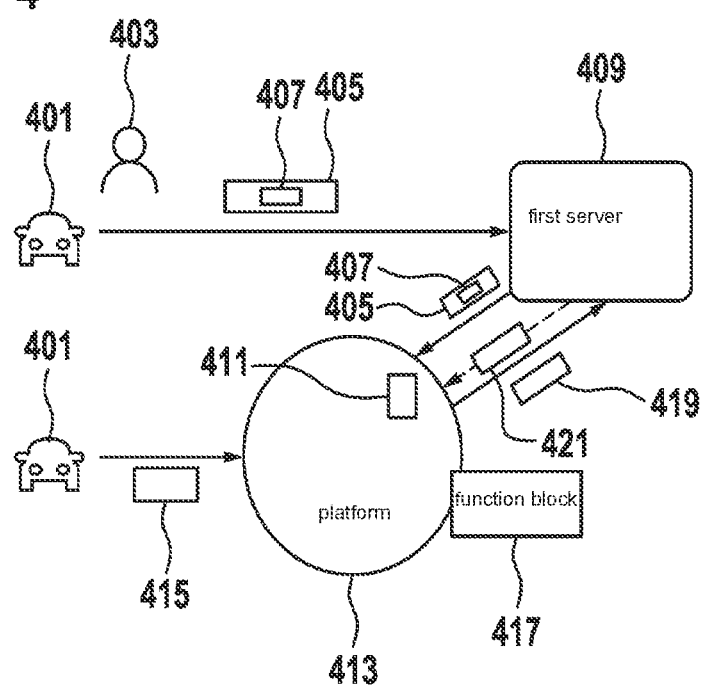
FIG. 4 shows a block diagram, according to an example embodiment of the present invention.

FIG. 4 is a block diagram, which describes the concept described here for the at least partially automated guidance of a motor vehicle within an infrastructure by way of an example.

A motor vehicle 401 or a driver 403 of motor vehicle 401 transmits an instruction 405 for the at least partially automated guidance of motor vehicle 401 within an infrastructure.

In other words, therefore, the instruction giver may be, for example, motor vehicle 401 or, for example, driver 403.

Instruction 405 comprises, for example, a first digital certificate 407.

First digital certificate 407 comprises a first data set, which comprises, for example, specification data of motor vehicle 401, which represent a technical specification regarding an at least partially automated guidance of motor vehicle 401.

For example, the first data set comprises identification data, which represent an identification of motor vehicle 401, and/or of driver 403 of motor vehicle 401.

In one specific embodiment (not shown), the instruction giver of instruction 405 may also be different from motor vehicle 401 and different from driver 403. For example, the instruction giver is a booking system.

Instruction 405 is transmitted to a first server 409 of a first operator of the infrastructure.

First server 409 checks whether instruction 405 is able to be executed. In particular, first digital certificate 407 is used for this purpose.

For example, first server 409 checks whether, based on the specification data, motor vehicle 401 is in fact capable of being guided in an at least partially automated manner within the infrastructure.

In the event of a positive first check, first server 409 transmits instruction 405 comprising first digital certificate 407 to a platform 413 for the at least partially automated guidance of a motor vehicle 401 within the infrastructure, more precisely to a second server 411, which is encompassed by platform 413. In one specific embodiment, it is provided that first server 409 transmits additional data to second server 411. These additional data comprise, e.g.: data beyond the specific instruction, e.g., that the motor vehicle is to be treated as a priority, i.e., is to be preferred, because, for example, the client is a premium customer; historical data relating to the motor vehicle; data between the operators (e.g., financial data).

Second server 411 of platform 413 checks whether instruction 405 is able to be executed. In particular, first digital certificate 407 is used for this purpose.

For example, second server 411 checks again whether, based on its specification data, motor vehicle 401 is in fact capable of being guided in an at least partially automated manner within the infrastructure.

It is provided, for example, that motor vehicle 401 provides platform 413 with a second digital certificate 415. This means in particular, therefore, that second server 411 receives such a second digital certificate 415.

Second digital certificate 415 may be, for example, identical to first digital certificate 407.

For example, it may be the case that second digital certificate 415 is different from first digital certificate 407 but second digital certificate 415 matches first digital certificate 407.

This means in particular, therefore, that the two certificates 407, 415 may form a certificate pair.

Second server 411 checks, for example, on the basis of second digital certificate 415 whether instruction 405 is able to be executed.

For example, second server 411 verifies whether second digital certificate 415 matches first digital certificate 407 and/or whether these two are identical.

Advantageously, this may bring about the technical advantage that it can be efficiently ensured that the motor vehicle 401 which platform 413 is to guide in an at least partially automated manner within the infrastructure is indeed the motor vehicle 401 which, according to instruction 405, is to be guided in an at least partially automated manner within the infrastructure.

In the event of a positive second check, the corresponding control signals are generated and output in a function block 417.

For example, the output control signals are transmitted to motor vehicle 401 by one or more communication devices (not shown) of platform 413.

For example, it is provided that platform 413 transmits an invoice 419 to the first operator, i.e., for example, to first server 409.

First server 409 can then, for example, initiate a payment 421 for the second operator of platform 413.

It is provided, for example, that motor vehicle 401 is guided by platform 413 in an at least partially automated manner within the infrastructure only in the event of appropriate payment of the invoice by the first operator.

It is provided, for example, that instruction 405 is executed only when driver 403 has made the payments required for this, and/or it is ensured that payments required for the at least partially automated guidance of the motor vehicle are being made, e.g., by direct debit or by consent(s).

In one general embodiment, the first server is responsible for checking a booking, and/or a parking capacity, and/or a payment, and/or for a general check of whether the motor vehicle is able to be guided in an at least partially automated manner, in particular parked in an at least partially automated manner, within the infrastructure, in particular within a parking facility or garage. This means in particular that, in this general embodiment, the first server carries out the corresponding steps.

In one general embodiment, the second server is responsible for checking a technical implementation and/or an actual implementation of the at least partially automated guidance, in particular of the at least partially automated parking. This means in particular that, in this general embodiment, the second server carries out the corresponding steps.

This means in particular that the first server and the second server each in particular fulfill different functions.

According to one specific embodiment, the concept described here comprises the technical procedure, and the interaction for the procedure of an automatic parking operation, and specifically the instruction processing.

The procedure starts according to one specific embodiment with a driver, generally a user, issuing an instruction for an automatic parking process.

This instruction, according to one specific embodiment, may be triggered manually (e.g., by the driver or by the user), or, in one specific embodiment, it may be triggered automatically by the motor vehicle itself.

In one specific embodiment, "automatically" may mean that, if the destination is known, the motor vehicle triggers the instruction automatically ahead of arrival (e.g., shortly before arriving), for example because the driver has stored it in the motor vehicle.

In this case, in one specific embodiment, the motor vehicle may also use additional channels, such as a mobile device, in particular a cellphone (in one specific embodiment, the instruction may be stored here too).

In one specific embodiment, the triggering by the driver may be executed in a similar manner. A difference, in one specific embodiment, is that the driver triggers the instruction.

Furthermore, in one specific embodiment, the instruction may also be triggered by another system (not depicted in the figures), e.g., a booking system, e.g., because a parking operation is part of a flight ticket.

In one specific embodiment, for all assignments, the instruction entails a parking garage operator being given the instruction for a defined motor vehicle to be parked automatically. Automatic parking may also be referred to as "Automated Valet Parking (AVP)".

For this purpose, in one specific embodiment, the instruction comprises specifying the motor vehicle to be parked (defined, for example, by the license plate and/or an electronic/digital identity label (ID), which is transmitted, e.g., by radio).

The parking garage operator checks in one specific embodiment whether execution of the instruction is permitted/possible. For example, one or more of the following checks are carried out:
  whether the defined vehicle is authorized for the AVP operation/the AVP process;
  whether the client is authorized for the AVP operation/the AVP process;
  whether the client really is the client (i.e., an identity check of the client, i.e., in particular, of the instruction giver);
  whether any payments that are required have been made (e.g., a one-off payment, subscription, permanent authorization, etc.);
  whether the AVP parking operation is available based on the technology (AVP motor vehicle and/or AVP parking garage infrastructure).

In one specific embodiment, in the event of a positive check, the parking garage operator then passes the instruction on to an AVP platform, which implements the AVP parking operation thereafter.

The prerequisite for the instruction processing and/or the AVP parking process in one specific embodiment is that the respective handovers and accesses to the systems are possible. This means, in particular, that they are "secure".

In one specific embodiment, security is provided by the fact that the respective systems are certain that the participating systems are the "right ones". This means that, for example, the instruction for the AVP operation was not given by an unauthorized user and/or an unauthorized system, and that the AVP platform is indeed parking the right motor vehicle.

This means in one specific embodiment that, in the case of an instruction and its implementation, it is ensured that:
  in one specific embodiment, the instruction for the AVP operation for the specific motor vehicle was given to the parking garage operator by an authorized user/driver/system (e.g., motor vehicle),
  in one specific embodiment, the instruction from the parking garage operator to the second operator of the AVP platform (and/or to the AVP platform) includes the right motor vehicle,
  in one specific embodiment, the second operator (and/or the AVP platform) parks the right motor vehicle and obtains the required access for this purpose.

In one specific embodiment, this security is ensured by certificates.

Using the certificate, it is ensured in one specific embodiment that the motor vehicle is the right one, and that access to the motor vehicle is possible.

In one specific embodiment, the certificate for the parking operation is made available to the AVP platform by the parking garage operator.

Furthermore, in one specific embodiment, a certificate exists in the motor vehicle.

With the presence of both certificates, in one specific embodiment, the AVP parking operation (technical implementation) is possible. Both systems (motor vehicle, AVP platform) in one specific embodiment have a certificate, or mutually matching certificates, which allow access to the motor vehicle and/or the AVP systems of the motor vehicle.

In one specific embodiment, the AVP platform is provided with a certificate once.

In one specific embodiment, the AVP platform is provided with a certificate permanently (but preferably such that it is subject to cancellation).

In one specific embodiment, the parking garage operator obtains the certificate with the instruction, for example from the driver or the motor vehicle; in one specific embodiment once, or in one specific embodiment permanently, but preferably such that it is subject to cancellation.

In one specific embodiment, the second operator (AVP operator) checks before the AVP parking process whether execution of the instruction is permitted/possible. For example, one or more of the following checks are carried out:
  whether the defined motor vehicle is authorized for the AVP operation/the AVP process (e.g., by way of the certificate(s));
  whether the client really is the client (→parking garage operator);
  whether any payments required for the AVP operation have been made (e.g., a one-off payment, subscription, permanent authorization, etc.); →an AVP operator;

whether the AVP parking operation is available based on the technology (AVP motor vehicle and/or AVP parking garage infrastructure).

In one specific embodiment, all accesses or important accesses are documented in a forgery-proof manner, e.g., in a blockchain.

In one specific embodiment, the procedure described above for the AVP transport operation may also be transferred to other applications; for example, for at least partially automated assistance (e.g., not highly automated control of the motor vehicle) during a driving operation, or for a takeover of control during a driving operation.

Examples are, e.g.:
remote control assistance of the motor vehicle during travel;
travel guided in an at least partially automated manner, in particular travel temporarily guided in an at least partially automated manner based on/by an infrastructure.

Examples of such applications are, e.g.:
travel through a tunnel, travel over a bridge, travel through a construction site, travel across a four-way junction, entry onto the freeway via an entrance ramp, including merging. With regard to the individual participants, by derivation, the operator of the parking garage would then be the road owner, and the operator of the AVP platform would be the operator of the platform. The platform may be part of the infrastructure. In one specific embodiment, it may thus be provided that the first operator is identical to the second operator. In one specific embodiment, the first operator is different from the second operator.

What is claimed is:

1. A method for an at least partially automated guidance of a motor vehicle within an infrastructure, comprising the following steps:
receiving first instruction signals by a first server of a first operator of the infrastructure, the first instruction signals representing an instruction of an instruction giver for the at least partially automated guidance of the motor vehicle within the infrastructure;
a first checking by the first server of whether the instruction is able to be executed;
transmitting of second instruction signals by the first server to a second server of a platform for the at least partially automated guidance of a motor vehicle within the infrastructure of a second operator in an event of a positive first check, the second instruction signals representing the second instruction for the at least partially automated guidance of the motor vehicle within the infrastructure;
a second checking by the second server of whether the instruction is able to be executed;
generating control signals for the at least partially automated control of a lateral and/or longitudinal guidance of the motor vehicle based on the instruction by the platform in an event of a positive second check, wherein the instruction is executed in an at least partially automated control of the lateral and/or longitudinal guidance of the motor vehicle; and
outputting the generated control signals.

2. The method as recited in claim 1, wherein first certificate signals, which represent a first digital certificate, are received by the first server, the first check being carried out based on the first digital certificate, the first digital certificate including a first data set, which includes one or more of the following data items: i) specification data of the motor vehicle which represent a technical specification regarding an at least partially automated guidance of the motor vehicle, and/or ii) identification data which represent an identification of the motor vehicle and/or of a driver of the motor vehicle and/or of the instruction giver.

3. The method as recited in claim 2, wherein in the event of the positive first check, the first digital certificate is transmitted by the first server to the second server, so that the second server receives the first digital certificate, the second checking being carried out based on the first digital certificate.

4. The method as recited in claim 3, wherein second certificate signals, which represent a second digital certificate, are received by the second server, the second check being carried out based on the second digital certificate, the second digital certificate including a second data set, which includes one or more of the following data items: i) specification data of the motor vehicle which represent a technical specification regarding an at least partially automated guidance of the motor vehicle, and/or ii) identification data, which represent an identification of the motor vehicle and/or of a driver of the motor vehicle and/or of the instruction giver.

5. The method as recited in claim 1, wherein: i) the first checking includes a check of whether the instruction giver has made payments required for the at least partially automated guidance of the motor vehicle, and/or ii) it is ensured that payments required for the at least partially automated guidance of the motor vehicle are being made.

6. The method as recited in claim 1, wherein: i) the second checking comprises a check of whether the first operator has made payments required for the at least partially automated guidance of the motor vehicle, and/or ii) it is ensured that payments required for the at least partially automated guidance of the motor vehicle are being made.

7. The method as recited in claim 1, wherein the second checking includes a check of whether the instruction transmitted by the first server is signed by a digital signature of the first operator.

8. The method as recited in claim 1, wherein the infrastructure is an element selected from the following group of infrastructure elements: parking facility, a parking garage, a tunnel, a bridge, a construction site, a junction, a four-way or three-way junction, an entrance ramp of a freeway, a toll station.

9. A system for the at least partially automated guidance of a motor vehicle within an infrastructure, comprising:
a first server; and
a platform;
wherein the system is configured for an at least partially automated guidance of a motor vehicle within an infrastructure, the system configured to:
receive first instruction signals by the first server of a first operator of the infrastructure, the first instruction signals representing an instruction of an instruction giver for the at least partially automated guidance of the motor vehicle within the infrastructure,
a first check by the first server of whether the instruction is able to be executed,
transmit second instruction signals by the first server to a second server of the platform for the at least partially automated guidance of a motor vehicle within the infrastructure of a second operator in an event of a positive first check, the second instruction signals representing the instruction for the at least partially automated guidance of the motor vehicle within the infrastructure, a second check by the second server of whether the instruction is able to be executed, generate control signals for the at least partially automated control of a lateral and/or longitudinal guidance of the motor vehicle based on the instruction by the platform in an event of a positive second check, wherein the instruction is executed in an at least partially automated control of the lateral and/or longitudinal guidance of the motor vehicle; and output the generated control signals.

10. A non-transitory machine-readable storage medium on which is stored a computer program for an at least partially automated guidance of a motor vehicle within an infrastructure, the computer program, when executed by a computer, causing the computer to perform the following steps:

receiving first instruction signals by a first server of a first operator of the infrastructure, the first instruction signals representing an instruction of an instruction giver for the at least partially automated guidance of the motor vehicle within the infrastructure;

a first checking by the first server of whether the instruction is able to be executed;

transmitting of second instruction signals by the first server to a second server of a platform for the at least partially automated guidance of a motor vehicle within the infrastructure of a second operator in an event of a positive first check, the second instruction signals representing the instruction for the at least partially automated guidance of the motor vehicle within the infrastructure;

a second checking by the second server of whether the instruction is able to be executed;

generating control signals for the at least partially automated control of a lateral and/or longitudinal guidance of the motor vehicle based on the instruction by the platform in an event of a positive second check, wherein the instruction is executed in an at least partially automated control of the lateral and/or longitudinal guidance of the motor vehicle; and outputting the generated control signals.

* * * * *